E. D. TUBBS.
SHAFT COUPLING.
APPLICATION FILED OCT. 21, 1920.
1,404,811.
Patented Jan. 31, 1922.
2 SHEETS—SHEET 1.
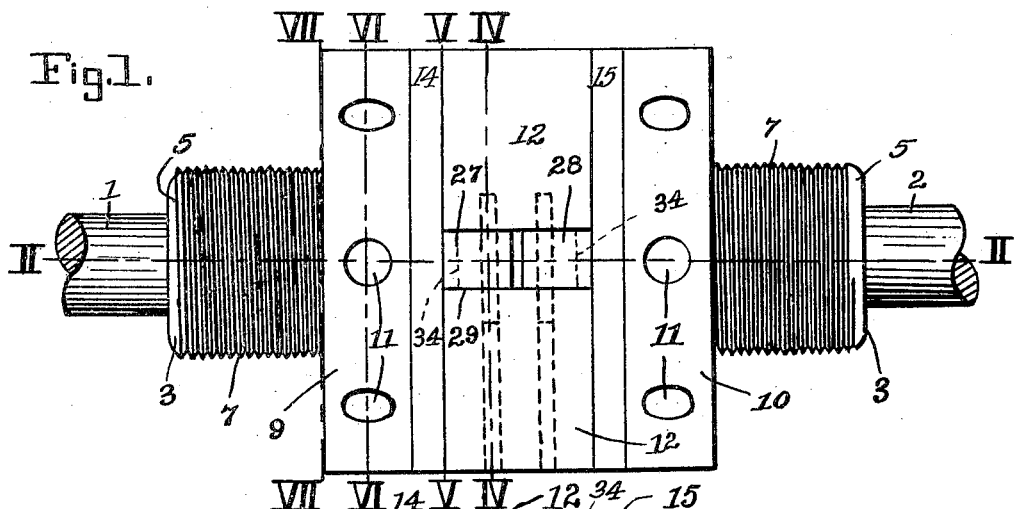

E. D. TUBBS.
SHAFT COUPLING.
APPLICATION FILED OCT. 21, 1920.

1,404,811.

Patented Jan. 31, 1922.
2 SHEETS—SHEET 2.

Earl D. Tubbs,
Inventor.
By Frederick V. Winters,
Attorney.

UNITED STATES PATENT OFFICE.

EARL D. TUBBS, OF NEW YORK, N. Y.

SHAFT COUPLING.

1,404,811. Specification of Letters Patent. Patented Jan. 31, 1922.

Application filed October 21, 1920. Serial No. 418,344.

*To all whom it may concern:*

Be it known that I, EARL D. TUBBS, a citizen of the United States, and resident of New York, in the county and State of New York, have invented certain new and useful Improvements in Shaft Couplings, of which the following is a full, clear, and exact specification.

This invention relates to shaft couplings, and has for its object to provide an improved coupling for the abutting ends of shafts, said coupling being of simple construction, easy to apply and efficient for the purpose for which it is intended.

A further object is to provide a coupling which is compact and generally cylindrical in form so that it simply constitutes a slight enlargement of the shafts at the point of connection thereof without presenting any protruding angles which might be dangerous. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views:—

Figure 1 is an elevation of a coupling made substantially in accordance with this invention and applied to the abutting ends of two shafts.

Figure 2 is a section on the line II—II of Figure 1.

Figure 3 is a similar section showing the positions of the parts of the coupling when first placed on the shafts and before it is tightened up thereon.

Figure 4:
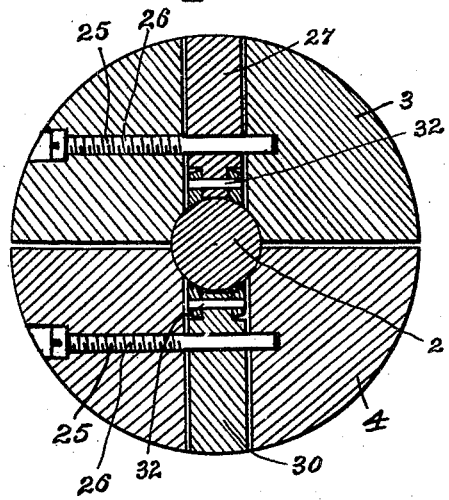
Figures 4, 5, 6 and 7 are transverse sections taken on the lines IV—IV, V—V, VI—VI and VII—VII, respectively, of Figure 1.
Figure 5:
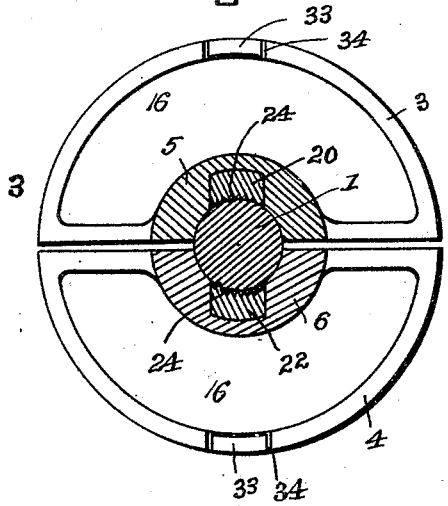
Figure 6:
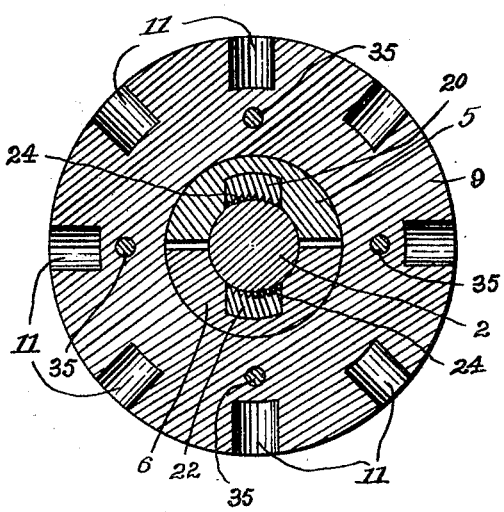
Figure 7:
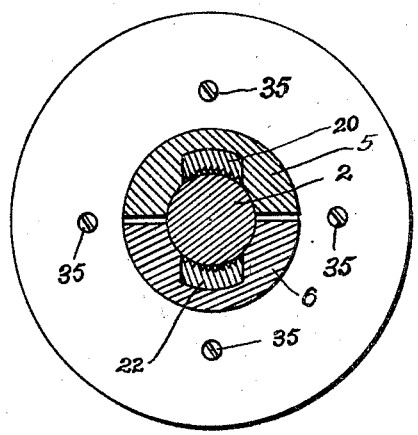

In the drawings the two shafts are indicated at 1 and 2 with their ends shown abutting in Figures 2 and 3. The coupling comprises two similarly shaped component members 3 and 4 each generally semi-cylindrical in form to embrace the abutting end portions of the shafts and together entirely surround the same. The end portions 5 and 6 of each of the members 3 and 4 are screw threaded at 7 and 8 to receive correspondingly threaded round nuts 9 and 10, each having sockets 11 in its periphery to receive a tool or wrench for turning them up tight in applying the coupling to lock the shafts together. The middle portion of each of the members 3 and 4 is radially enlarged at 12 and 13, respectively, to substantially the size of the nuts 9 and 10, so that the peripheries of said middle portions of the coupling members 3 and 4 and of the nuts will be flush with each other and constitute a smooth and continuous surface. Between the nuts 9 and 10 and the enlarged middle portions 12 and 13 of the coupling members there are placed washers 14 and 15 each of which is preferably cut away at 16 on the side facing the middle portions 12 and 13 of the coupling members in order to reduce weight. The end portions of said portions 12 and 13 are also preferably cut away at 17 for the same purpose.

Each member 3 and 4 has a longitudinal groove extending through the same as shown at 18 and 19, each of said grooves being tapered from the center to the ends of said members and arranged at diametrically opposite points in said members with respect to the shafts. In said grooves are fitted correspondingly shaped slidable gripping or clamping members 20 and 21 in one member of the coupling and 22 and 23 in the other member thereof. Said gripping members conform to the grooves in which they are placed and to the curvature of the shafts, and have longitudinally extending serrations of teeth 24 on their inner faces to bite into the end portions of the shafts when clamped thereon.

Inasmuch as the gripping members and the grooves in which they are fitted are tapered, it will be seen that longitudinal movement of said gripping members in their grooves will result in radial movement thereof. The gripping members or wedges will, therefore, be withdrawn from gripping engagement with the shafts when they are moved longitudinally towards the center of the coupling because the grooves are larger in the center of the coupling than at the ends thereof, and for the same reason outward longitudinal movement of the wedges will cause them to move radially inward for gripping the shafts and locking them to the coupling. This longitudinal movement of the wedges or gripping members is effected by levers one pair of which is pivoted in a suitable recess in each member of the coupling by means of pivot pins 25 best shown in Figure 4 and which may be secured in place in any suitable manner, as by being threaded at 26 to engage correspondingly threaded passages in the enlarged middle portions 12 and 13 of the coupling members, said pivot pins passing through the levers intermediate of their ends. Said levers are arranged in oppositely facing pairs 27 and 28 in the recess 29 of the upper coupling member, and 30 and 31 in the recess 32 in the lower coupling member. It will be noted that said recesses extend radially through the middle portions of the coupling members from their outer to their inner surfaces. The inner ends of the levers are pivoted to the inner ends of the wedges by pivot pins 32$^a$, while the outer ends of said levers have longitudinally extending lugs 33 fitted in notches 34 in the periphery of the middle portions of the coupling members and adapted to project beyond the end faces of said portions when the wedges are in non-gripping position, as shown in Figure 3.

After the coupling members have been applied to the two shafts to be connected as shown in Figure 3, the nuts 9 and 10 are turned up so as to press the washers 14 and 15 against the projecting lugs 33 of the levers which control the wedges. When the washers have in this way been moved up to engagement with the end faces of the enlarged middle portions of the coupling members and the lugs on the levers have been driven in flush with said end faces, the wedges or gripping members 20, 21, 22 and 23 will have been moved outward longitudinally the necessary distance to drive the serrations or teeth on said wedges into firmly gripping engagement with the shafts. If it should be necessary to remove the coupling, the nuts are first turned away from the washers so as to release the levers, and said levers swung apart at their outer ends by driving a wedge (not shown) between said ends, whereby the wedges are moved to the unlocking position shown in Figure 3 and the shafts thus released.

The nuts may be locked to the washers by set screws 35 as shown in Figure 2, said screws helping to prevent the nuts from working loose.

Having thus described my invention, what I claim as new and desire to secure by Letters Patent of the United States is:—

1. In a shaft coupling, the combination with shaft-embracing members having tapered grooves in their inner surfaces, of wedges fitted in said grooves for longitudinal movement therein, levers carried by said members for moving the wedges longitudinally for causing them to grip the shafts to be connected, and means for actuating said levers.

2. In a shaft coupling, the combination with shaft-embracing members having tapered grooves in their inner surfaces, of wedges fitted in said grooves for longitudinal movement therein, levers for actuating said wedges, said members having enlarged portions in which said levers are mounted, and means carried by the smaller portions of the members for engaging the ends of the levers to operate the same for bringing the wedges into clamping engagement with the shafts to be connected.

3. In a shaft coupling, the combination with shaft-embracing members having tapered grooves in their inner surfaces, of wedges fitted in said grooves for longitudinal movement therein, levers for actuating said wedges, said members having enlarged portions in which said levers are mounted and from the ends of which the outer ends of the levers project, and means carried by the smaller portions of the members to engage said projecting ends of the levers for bringing the wedges into clamping engagement with the shafts to be connected.

4. In a shaft coupling, the combination with shaft-embracing members having tapered grooves in their inner surfaces, of wedges fitted in said grooves for longitudinal movement therein, levers arranged radially in said members for actuating said wedges, the ends of the levers being housed in recesses in the surface of said members, and means for actuating said levers.

5. In a shaft coupling, the combination with shaft-embracing members having tapered grooves in their inner surfaces, of wedges fitted in said grooves for longitudinal movement therein, levers carried by said members for moving the wedges, said levers having projections on their outer ends extending beyond the ends of the portions of the members in which they are mounted, said levers being mounted in enlarged portions of the members, and the smaller portions of said members being threaded, and nuts on said threaded portions of the members for actuating said levers through the projecting ends thereof.

6. In a shaft coupling, the combination with shaft-embracing members having tapered grooves in their inner surfaces, of wedges fitted in said grooves for longitudinal movement therein, said members having enlarged portions and smaller portions, the latter having screw threads thereon, levers carried by the enlarged portions of the members for actuating said wedges, the outer ends of said levers projecting from the ends of said enlarged portions of the members, washers mounted on the smaller portions of the members for engaging the projecting ends of the levers, nuts on the screw threaded portions of the members for forcing the washers into engagement with the levers to move the wedges into clamping engagement with the shafts to be connected, and set screws in the nuts for locking them to the washers.

7. In a shaft coupling, the combination with shaft-embracing members having oppositely tapered grooves in their inner surfaces, of wedges fitted in said grooves for longitudinal movement therein to grip the shafts to be connected, said members having radial recesses extending through them, levers mounted in said recesses in pairs and connected to the wedges, said levers in each pair being oppositely arranged, whereby movement thereof towards each other will effect the same movement of the oppositely arranged wedges, and movement of said levers in opposite directions will operate said wedges in the reverse direction, and means carried by the members of the coupling for operating the levers one way, there being a space between each pair of levers for the introduction of a tool for moving them the other way.

In testimony whereof I have signed my name to this specification.

EARL D. TUBBS.